US006365908B1

(12) United States Patent
Waigel et al.

(10) Patent No.: US 6,365,908 B1

(45) Date of Patent: Apr. 2, 2002

(54) INDICATOR FOR INDICATING THE PRESENCE OF A LIQUID

(75) Inventors: Hans Waigel, Schnuerpflingen; Reiner Haeufele, Laupheim, both of (DE)

(73) Assignee: Gardena Kress + Kastner GmbH (DE)

( * ) Notice: Subject to any disclaimer, the term of this patent is extended or adjusted under 35 U.S.C. 154(b) by 0 days.

(21) Appl. No.: 09/374,948

(22) Filed: Aug. 16, 1999

(30) Foreign Application Priority Data

Aug. 17, 1998 (DE) ........................................ 198 37 050

(51) Int. Cl.7 ............................................... G01N 15/06

(52) U.S. Cl. .................................. 250/574; 250/227.25

(58) Field of Search ................................ 250/574, 577, 250/227.25, 901, 903, 227.11; 340/618, 619

(56) References Cited

U.S. PATENT DOCUMENTS

| | | | | |
|---|---|---|---|---|
| 2,240,988 A | | 5/1941 | Hertel | |
| 3,384,885 A | * | 5/1968 | Forbush | 250/903 |
| 4,935,621 A | * | 6/1990 | Pikulski | 250/229 |
| 5,159,834 A | | 11/1992 | Eisele | 250/577 |
| 5,381,022 A | * | 1/1995 | Nemeth et al. | 250/903 |
| 5,505,082 A | | 4/1996 | Cushman et al. | 73/170.21 |
| 5,507,326 A | | 4/1996 | Cadman et al. | 141/198 |
| 5,534,708 A | * | 7/1996 | Ellinger et al. | 250/577 |

FOREIGN PATENT DOCUMENTS

| | | |
|---|---|---|
| CH | 581 830 | 11/1976 |
| DE | 35 32 199 | 3/1987 |
| DE | 40 06 174 | 7/1991 |
| DE | 42 09 680 | 9/1993 |
| DE | 43 43 474 | 7/1994 |
| EP | 0 099 498 | 2/1984 |

* cited by examiner

*Primary Examiner*—Que T. Le
(74) *Attorney, Agent, or Firm*—Akerman Senterfitt

(57) ABSTRACT

A description is given of a rain indicator (1), which has a light source in the form of a light emitting diode (36) and a light detector in the form of a photodiode (37). There is a light guide (20) made from a material transparent to the light of the light source and e.g. glass, which has at least one surface portion (45, 46) exposed to the precipitation and which is so positioned relative to the light source that the light source light is totally reflectable towards the light detector on the surface portion. When the surface portion is dry light passes by total reflection to the light detector. In the case of precipitation a gap (43, 44) adjacent to the surface portion fills with liquid and the light intensity is substantially coupled out of the light guide (20) and no light passes to the light detector. Total reflection again occurs when the gap dries out.

41 Claims, 2 Drawing Sheets

INDICATOR FOR INDICATING THE PRESENCE OF A LIQUID

FIELD OF THE INVENTION

The invention relates to a liquid indicator, particularly a precipitation indicator, such as a rain indicator.

Liquid indicators can e.g. be used for determining the precipitation situation in the form of stationary rain indicators in the domestic and garden sector, so as to control an automatic watering system. A device of this type must e.g. be in a position to emit one or more precipitation signals in the case of rain, long-lasting, dense fog or other wetting precipitations and on whose reception the watering system can be switched off, so as to prevent overwatering of the monitored area and save water. One or more dry signals are to be emitted if precipitation adequate for the desired or necessary wetting action does not fall, so that the watering system can assume responsibility for providing the necessary wetness.

The problem of the invention is to provide a liquid indicator more particularly usable as a precipitation indicator. The device must in particular be in a position to make a reliable distinction between precipitation situations and dry situations.

SUMMARY OF THE INVENTION

This problem is solved by a liquid indicator having the features of claim 1.

The liquid indicator usable as a rain indicator and as a result of this preferred application also called a precipitation indicator has at least one light source and at least one light guidance body or light guide, which is made from a material transparent to the light of the light source. The light guide has at least one surface portion, which is intended for contact with the liquid, particularly the liquid precipitation and which is so positioned relative to the light source that the light of the latter is totally reflectable on the surface portion if total reflection conditions exist on said surface portion. There is also at least one light detector, which can be brought into light-conducting connection with the light source by means of the surface portion.

Thus, an optical liquid or precipitation sensor is created, in which in the case of liquid, particularly precipitation, modifies the light conditions between the light source and the light detector to a significant extent. For as long as the surface portion is substantially dry, because there is e.g. little or no adequate precipitation, on the surface portion the optically dense material of the e.g. glass or visible light-transparent plastic light guide with a typical refractive index of well above 1, e.g. approximately 1.5 and the gaseous ambient atmosphere with a typical refractive index of approximately 1 are adjacent to one another. If the surface portion with respect to the light falling from the light guide side coming from the light source with respect to the average incidence direction relative to the normal to the reflecting surface is at an incidence angle greater than the material-specific critical angle of the total reflection, then the light is totally reflected on the surface portion and at this point cannot leave the light guide and is instead toally reflected into its interior. With such a dry situation one or more dry signals associated with the dry state are emitted. However, if the surface portion, particularly due to precipitation, is in contact with water and is more particularly wetted by the latter, due to the higher refractive index of water compared with air of typically approximately 1.3, the reflection conditions at the surface portion change in such a way that there is no total reflection and instead light passes out of the light guide at the surface portion, i.e. is coupled out of the same. This wetting situation referred to as the precipitation situation leads to the emission of one or more liquid or precipitation signals. Following adequate drying of the surface portion, once again total reflection conditions occur and a dry signal can be emitted. Further developments are explained hereinafter using the example of a precipitation indicator and the term "precipitation" can optionally also stand for other liquids.

For the detection of the precipitation on the surface portion it is possible to use the light intensity transmitted by the latter and also the totally reflected intensity, either in alternative or combined form. In a preferred embodiment the light detector is so positioned with respect to the surface portion, that substantially only the light source light totally reflected by the surface portion is detectable. A direct light conduction between the source and the detector is appropriately prevented. The exclusive use of the reflected intensity for precipitation detection is inter alia advantageous because the light detector can then e.g. be positioned within the light guide and/or the solid side of the surface portion, which permits a compact construction and also facilitates the protection of the light detector against moisture and damage.

Particular preference is given to embodiments in which in the light path between the light source and light detector there are several and in particular two surface portions at an angle to one another, which are so positioned relative to the light source and one another, that the light of the light source can be totally reflected by them to the light detector. As a result of the thus possible at least double deflection between the light transmitter or source and light receiver or detector, there is a significant rise in the distinction reliability between the dry state and the precipitation state, because there is only an adequate light intensity at the light detector if there are total reflection conditions, due to dryness, on all the totally reflecting surface portions in the light path.

Particular preference is given to embodiments in which at least two surface portions are positioned in such a way that the light source light, in the case of total reflection is deflected by more than 90°, particularly substantially by 180°. This permits a compact construction, in which the light source and light detector can e.g. be closely juxtaposed on one side of the light guide, whereas the surface portions to be wetted are located in the area of the opposite side. The light guide can e.g. have a circular conical segmental part with an aperture angle of approximately 90° on which are arranged in diametrically facing manner curved, totally reflecting surface portions, which can exert a certain light focussing action. It is also possible for the light guide to have at least two planar surface portions at an angle of 90° to one another and e.g. constructed in the form of a roof prism.

It is possible to use any suitable light source or combination of light sources and any suitable light detector responding to the light source light. Particularly cost-effective, reliably functioning and energy consumption-favourable embodiments are characterized in that the light source has at least one and preferably precisely one light emitting diode and/or that the light detector has at least one and preferably only one photodiode. An energy saving effect can be obtained if there is a device for the continuous operation of the light source, particularly for pulsed operation and optionally the pulse spacing can be adjustable. The time interval between successive and optionally very short light emissions can be in the second or minute range, e.g. approximately 10 or 30 or 60 seconds or more. Particularly consumption-favourable embodiments can advantageously operate in mains-independent manner and can e.g. be supplied with electric power by batteries, accumulators and/or photovoltaic elements. However, a mains-dependent supply is alternatively or additionally possible.

In preferred embodiments there is at least one precipitation reservoir for collecting precipitation and then a precipitation reservoir is preferably adjacent to a surface portion. As a result the response reliability of the indicator can be increased and erroneous indications are largely avoided, because a signal change from dry to precipitation will, in the case of a corresponding design, only occur with an adequately filled precipitation reservoir, so that possibly unproductive, short showers are not interpreted as a precipitation situation and cannot e.g. lead to the disconnection of a controlled watering system. It is preferably for the precipitation reservoir to be constructed as a capillary reservoir, in which capillary forces significantly bring about and/or promote a filling of the reservoir and/or a keeping of liquid in the reservoir. The reservoir can be so designed that it only fills in the case of precipitation with a specific intensity and/or that following the fading away of the precipitation there is still a certain time lag until the reservoir content evaporates, so that only significant, relatively long-phase changes between precipitation and dryness lead to signal changes.

In preferred embodiments there is at least one gap formed between the surface portion and an opposing surface, in which precipitation, optionally assisted by capillary forces, collects and can be retained for a certain time. For example by suitable colouring and/or surface design, e.g. roughening or stepping, the opposing surface can be constructed as an absorption surface for the light source light, so that light intensity entering the liquid-filled gap when total reflection ends is essentially absorbed by the opposing surface and cannot pass as stray light to the light detector.

Embodiments with an adjustable response threshold are particularly advantageous, i.e. when the precipitation intensity at which the sensor is to respond can be fixed by the user. In embodiments with a precipitation reservoir this can be particularly easily implemented in that said reservoir has an adjustable capacity and preferably the shape and/or size of the gap adjacent to the surface portion can be adjusted.

Further measures for improving the precipitation indicator, particularly its response reliability, are explained hereinafter in conjunction with preferred embodiments. It is in particular possible to associate with the indicator collecting means for collecting precipitation, which are connected by means of a precipitation supply device in liquid-conducting manner to the surface portion, particularly the precipitation reservoir. This makes it possible to provide a relatively large collecting surface for the precipitation, whilst the surface portion area necessary for precipitation detection can be kept very small. A corresponding funnel action can be obtained by suitable design elements on a casing of the precipitation indicator, e.g. by suitable water guidance channels on a casing outside, the water guidance channels comprising vertical grooving on an upper portion of a casing and/or collecting guides converging in funnel-shaped manner on the casing circumference and inclined to the vertical.

Retention means, explained in greater detail in conjunction with the embodiments, can be provided for retaining the precipitation on the surface portion, particularly in the precipitation reservoir, which in particular makes it possible to set a suitable time lag between the ending of precipitation and the emission of a dry signal. For this purpose e.g. web-like elements located in a gap adjacent to the surface portion can form additional wetting surfaces for the precipitation, which suitably delay the flowing away or evaporation of the reservoir content. The elements can be simultaneously used as spacing elements for adjusting and maintaining a suitable gap geometry.

Preferred embodiments of inventively operating precipitation indicators are characterized by a modular construction with several, detachably interconnectable parts. In particular, there is a preferably cartridge-shaped, particularly moisture-tight sealable indicator upper part, which can be inserted into a preferably cylindrical, top-open basic casing with a larger diameter and this takes place portionwise in such a way that between an outside of the indicator upper part and a basic casing wall is formed at least one entry gap, which can e.g. be a circumferential annular clearance or can be formed by several annular segments. The outside of the indicator upper part projecting over the lower part can be used for large-area precipitation collection and the collected precipitate can pass through the entry gap into the otherwise substantially outwardly protected interior of the basic casing.

The light source, a control electronics for the light source, the light detector, an evaluation electronics for the light detector and the light guide can be so arranged on and/or in a casing part of the indicator, particularly its upper part, that the surface portion forms part of the outer surface of said part. In particular the light guide can form a lower termination of the indicator upper part and preferably at least one surface portion is arranged substantially in an extension of the outer surface of the indicator upper part, so that liquid running on the exterior of said upper part flows to the surface portion.

Such an indicator upper part, which preferably also has a watertight sealable reception space for a power supply for the control and evaluation electronics, can be used not only in the case of precipitation indicators according to the invention, but e.g. also as autarchically operating liquid indicators in a container, pond, etc. In such cases there is no need for measures for the supply, maintenance and/or removal of liquid and/or a liquid reservoir. A liquid signal can be emitted if the surface of a liquid to be monitored has risen to the vicinity of or above the surface portion.

For the creation of a precipitation indicator the indicator upper part and basic casing can be detachably interconnected preferably without tools and preferably the upper part can be fixed in the basic casing and/or screwed to the basic casing, e.g. by means of a manually operable cap nut. The basic casing can have a counterbody with the gap opposing surface, so that by adjusting the position of the indicator upper part in the basic casing, it is possible to adjust the shape and/or size of the gap serving as a precipitation reservoir.

The indicator can be fixed in a stable, stationary manner in the vicinity of the area to be monitored, e.g. by means of a screw-down mandrel or the like, feet or other fastening means. The signals for indicating the dry state or precipitation state can be emitted to the outside by means of cables or without wires, e.g. by means of an integrated infrared transmitter, for the purpose of the further processing of said signals.

These and further features can be gathered from the claims, description and drawings and the individual features, either singly or in the form of sub-combinations, can be implemented in an embodiment of the invention and in other fields and can represent advantageous constructions.

Embodiments of the invention are described hereinafter relative to the attached drawings, wherein show:

DETAILED DESCRIPTION OF THE DRAWINGS

Figure 1:
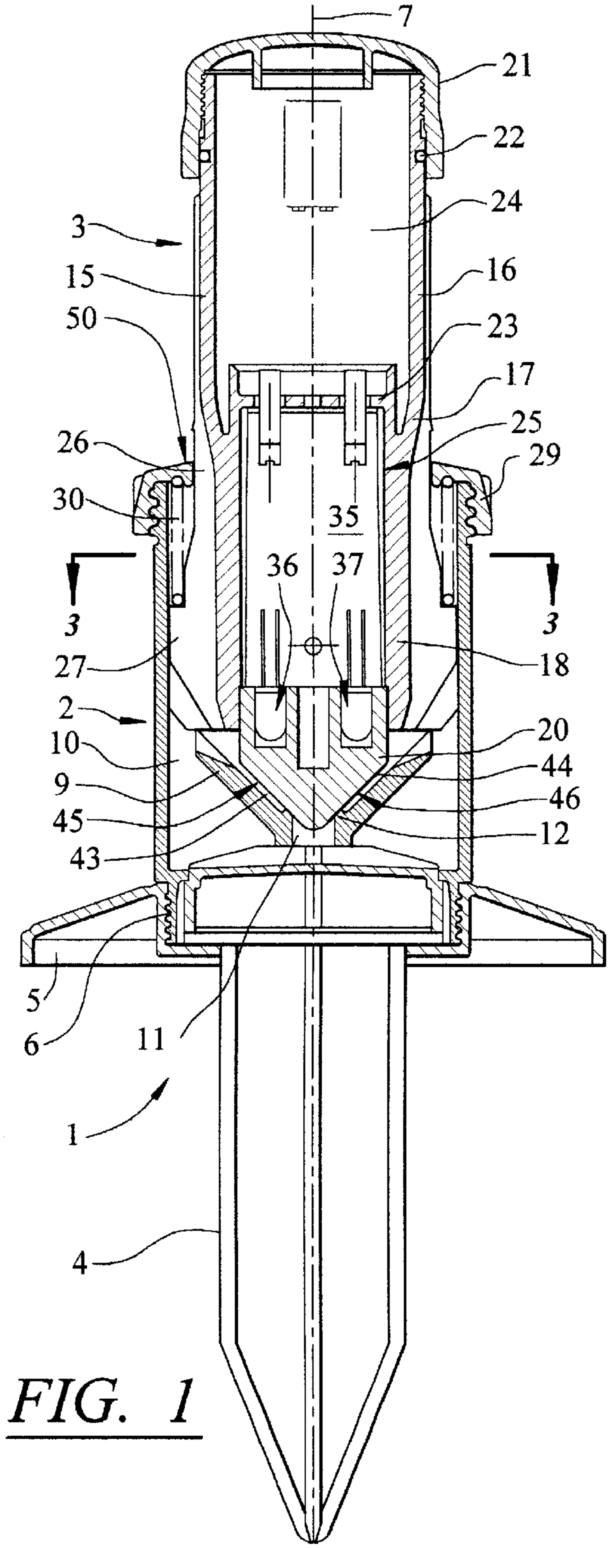
FIG. 1 A longitudinal section through a first embodiment of a rain indicator according to the invention.

The longitudinal section of FIG. 1 shows a first embodiment of a preferably vertically installable liquid or precipitation indicator 1, usable as a rain indicator and placed in stationary manner on the ground, e.g. in a piece of lawn and which has three manually, tool-free assemblable subassemblies. In a substantially cylindrical basic casing 2 made from a thermoplastic material is centrally inserted and held in stable manner from above a cartridge-shaped indicator upper part 3 called the measuring cartridge. A cross-sectionally cruciform mandrel 4 for insertion in the ground is centrally screwed by means of a cap nut in the form of a screw disk 5 serving as an insertion stop to a lower externally threaded lug 6 of the basic casing 2.

Figure 3:
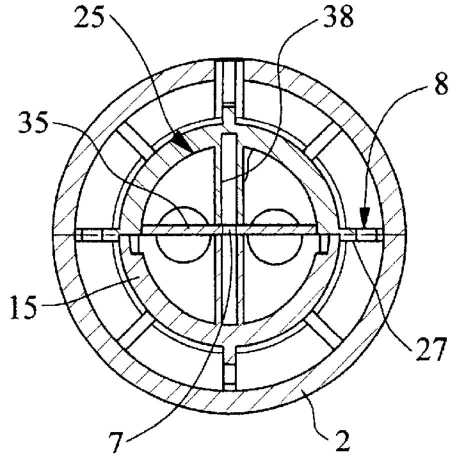
FIG. 3 A cross-section along line III—III in FIG. 1.

The cross-sectionally (FIG. 3) cylindrical basic casing 2 has on its side walls axial guide slots 8 diametrically facing the central axis 7. In the bottom area is centrally provided a funnel-shaped body 9 substantially constructed as an upwardly widening, conical funnel and which is connected by means of radial holding webs 10 to the side wall of the basic casing 2 and which has a central, lower passage opening 11 by means of which the interior of the basic casing 2 is connected in liquid conducting manner to the area of the mandrel 5. Around the funnel circumference are distributed several web-like projections 12 on the substantially frustum-shaped funnel inside in the lower area directly above the central opening 11.

The measuring cartridge 3 has an injection moulded plastic casing 15 with a roughly cylindrical upper portion 16, to which is connected downwards a downwardly conically tapering intermediate portion 17 and a cylindrical lower portion 18. A circular, lower, front opening of the casing 15 is closed in watertight manner by a subsequently explained light guide 20. The facing open end of the casing 15 can be sealed in watertight manner by a screw cover 21, whose internal thread engages in a front external thread of the upper portion 16 and whose inside engages on a packing ring 22, which is inserted in an annular groove on the outer circumference of the upper portion 16. Roughly centrally between the front openings of the casing 15 is provided an intermediate wall 23 running transversely to the axis 7 and which in the interior of the casing 15 is subdivided into an upper reception space 24 for batteries or accumulators and a cylindrical lower reception space 25 for the rain indicator electronics.

Figure 2:
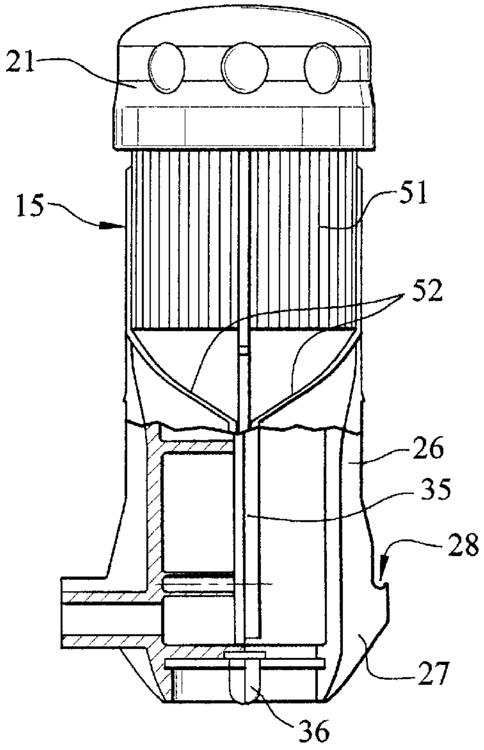
FIG. 2 A part sectional side view of the indicator upper part of an embodiment similar to FIG. 1.

Axially directed, radially projecting longitudinal webs 26 are arranged diametrically to the central axis 7 on the outside of and in one piece with the casing 15. In the vicinity of the lower end of the longitudinal webs are provided centring members 27 in the form of radially outwardly projecting extensions of the longitudinal webs, the top of a centring member, as shown in FIG. 1, being roughly planar or, as shown in FIG. 2, provided with an upwardly open bearing trough 28. The radially outer edges of the centring members 27, at least on insertion of the measuring cartridge 3 into the basic casing 2, form a lateral guide within the guide slots 8. The measuring cartridge is inserted axially into the basic casing 2 until the light guide 20 engages on the projections 12, acting as spacing elements and constructed in one piece with the funnel 9 constituting a counter-body. The cartridge 3 is then pressed downwards by means of the cap nut 29 which can be screwed onto the upper opening of the basic casing 2 and by means of a pressure-loaded spring 30 supported on the centring members 27 and the underside of the cap nut. The lateral longitudinal webs 26 of the cartridge are closely fitted into the inner recess of the cap nut 29 and ensure a wobble-free, coaxial seating of the cartridge 3 in the basic casing with the cap nut screwed down and the compression spring 30 taut.

In its lower reception space 25, the measuring cartridge 3 receives a control and evaluating electronics constructed on a plate 35 and symbolized by the latter, which controls a light source in the form of a light emitting diode 36 and which evaluates a detector signal generated by a light detector in the form of a photodiode 37. In the sectional representation of FIG. 3 the casing 15 of the cartridge 3 is represented in two parts with a plate 35 jammed between double webs 38. It is also preferable and preferred to construct the cartridge casing in one piece and to insert the plate with the light source 36 fixed thereto, the detector fixed thereto, as well as the subsequently explained light guide 20, from below into the cartridge casing. The electric power for the light source, light sensor and control and evaluation electronics 35 is provided by batteries or accumulators to be inserted in the reception space 24. Alternatively or additionally to the mains-independent supply, there can also be a cable-bound supply through a supply unit connected to the rain indicator 1. To reduce the power consumption, particularly in embodiments operating in mains-independent manner, the light emission of the light source 36 can be pulsed, preferably with a short timing ratio of e.g. one pulse per minute.

Figure 4:
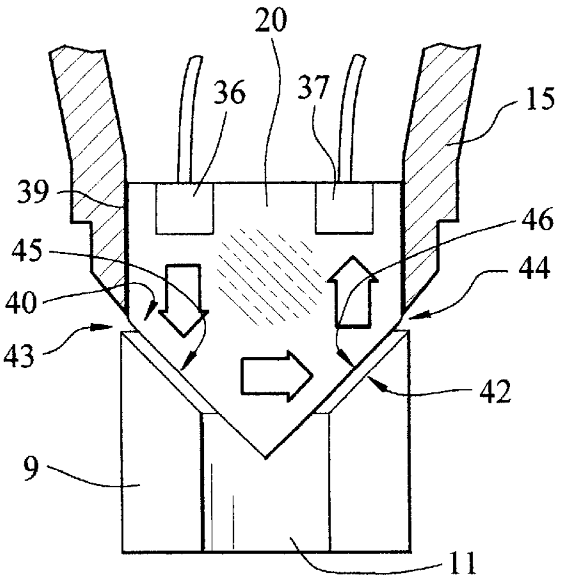
FIG. 4 A diagrammatic representation of the light conducting conditions in the dry state.
Figure 5:
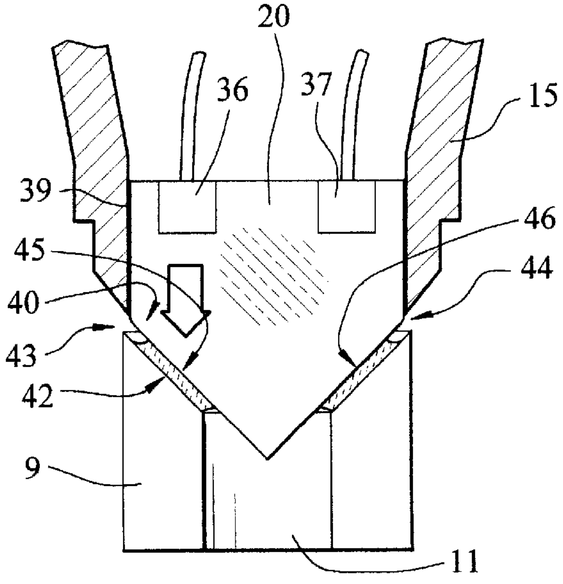
FIG. 5 A diagrammatic representation of the light conducting conditions with precipitation.

The light guide 20 made from glass or a plastics material transparent to the light of the light source 36 and which is diagrammatically shown in FIGS. 4 and 5, is an essential element of the precipitation indicator 1. It has a cylindrical portion 39 arranged coaxially to the axis 7 and at the top in FIG. 1, in which are provided in diametrical manner to the axis 7 two blind hole-like recesses for light source 36 or light detector 37. Between them are preferably provided means, which prevent a direct light conduction between the light source and the light detector, e.g. an opaque partition, which is located in a central recess of the light guide. To the cylindrical portion 39 is connected in the downwards direction a circular conical portion 40, whose rounded cone apex, with the indicator assembled, projects downwards into the vicinity of the opening 11 of the counterbody 9. The substantially conical surface 41 of the light guide facing the conical inside of the counterbody 9 faces with a small spacing determined by the height of the spacing elements 12 the opposing surface 42 of the counterbody 9 running parallel to the conical surface and shaped as a conical recess. The conical surface 41 and opposing surface 42 enclose between them narrow, approximately conical segmental gaps 43, 44.

The operation of the precipitation indicator will now be explained in conjunction with FIGS. 4 and 5, FIG. 4 showing a dry state and FIG. 5 a precipitation state. During rain indicator operation, the light source 36 preferably operated in pulsed manner irradiates a surface portion 45 of the conical surface 41 in the vicinity of the gap 43. With respect to a normal to the reflecting surface on the portion 45, the light arrives in a mean incidence angle of approximately 45°. In dry weather or with very limited precipitation the gap 43 is air-filled, as shown in FIG. 4. As a result of the orientation of the surface portion in a downwardly inclined manner, no precipitation can directly strike these surfaces. In the case of an air-filled gap 43, at the interface 45 between the optically denser light guide 20 and the optically thinner medium air in gap 43, the light at the interface 45, which is at an angle of 45° to the axis 7, is totally or at least largely reflected. At gap 44, the reflected light is deflected on the surface portion 46 of the conical surface 41 facing the axis 7. This gap is also air-filled, which is usually the case in dry weather, so that once again a total reflection occurs in the prism block with deflection of the light to the detector 17, substantially no light leaving the light guide in the direction of gap 44.

With such a light deflection of in all 180° represented by the double arrows in FIG. 4, in dry weather and with the light source switched on, the detector 37 records a pronounced light incidence and the electronics 35 emits a “dry” indication or passes into a “dry” switching state with respect to an external apparatus, e.g. an automatic watering system.

When precipitation falls, it strikes the portion of the cartridge 3 projecting above the basic casing 2. Between the outside of the conical intermediate portion 17 of the cartridge 3 and the inside of the cap nut there is a free entrance gap 50 in the form of an annular clearance, through which liquid precipitation, such as rain water, can flow downwards along the cartridge casing 15 in the interior of the basic casing to the surface portions 45, 46 in the extension of its lower end. The collection of precipitation can be assisted by suitable collecting means, which are connected in liquid-conducting manner to the surface portions 45, 46 by precipitation supply devices. In the embodiment shown in FIG. 2, on the outside of the surface portion 16 of the cartridge 3 is provided a substantially vertically orientable, fine grooving 51, which provides numerous downwardly directed water guidance channels and which ensures that only small drops are formed, which rapidly flow downwards. Roughly level with or somewhat above the upper edge of the basic casing 2 is provided for each of the surface portions 45, 46 a pair of collecting guides 52 for inflowing water converging in the direction of the associated surface portion and which are constructed as guidance surfaces, projecting slightly from the casing outer surface, in the form of oppositely oriented quadrant coiled portions. This leads to a funnel action and to the collection of the liquid running down the upper portion towards the surface portions 45, 46 or gaps 43, 44 adjacent thereto and the gap filling can be accelerated.

If at least one of the two gaps 43, 44 serving as precipitation reservoirs is filled as a result of the inflowing rain water, the above-described interface situation leading to total reflection is ended and there is no or no significant total reflection. Instead, as shown in FIG. 5, the light passes out of the prism block 20 through the surface 45 and with a residual portion possibly through the surface 46 and is guided through the liquid-filled gap to the opposing body 9, which absorbs the light. Particularly if both gaps 43, 44 are liquid-filled, particularly if the light source 36 lights up, substantially no further light intensity passes to the detector 37 and in this case the electronics indicates the “rain” state.

The light guide 20 is oriented in self-centring manner as a result of its conically tapering shape and the support on the spacing webs 12 of the counterbody 9. The spacing webs 12 are provided on the lower ends of the gap areas 43, 44, which are irradiated by the light source 36 and monitored by the detector 37. Besides ensuring a precise spacing between the prism block 20 and the counterbody 9, the spacing webs 12 fulfil a further function in that water in the gap cannot flow directly downwards at the locations of the spacing webs and at the end of precipitation the gap areas 43, 44 decisive for detection purposes remain longer water-filled. In the circumferential direction laterally of the gap areas 43, 44 there are no spacing webs or at least they are interrupted, so as to permit at these points an unhindered outflow of water, so that there is no water accumulation in the entire cone of the counterbody. In addition, the surface areas of the counterbody 9 can be stepped laterally of the irradiated or monitored gap areas 43, 44 and/or be removed further from the light guide 20, so as to facilitate in this area a rinsing out of dirt particles. The excess water and any entrained dirt can be passed downwards through the central passage opening 11 of the counterbody and by means of a lower opening in the basic casing to the outside. Spacing webs can ensure a better seating of the prism block on the counterbody, also in a position turned e.g. by 90°, but then essentially fulfil no retention function for optical water detection, unless use is made of a crossed optical arrangement with two light sources and two detectors.

The gaps 43, 44 associated with the detection-decisive surface portions 45, 46 serve as precipitation reservoirs through which it is possible to increase the detection reliability of the device. Thus, a precipitation indication is only given if the precipitation quantity is adequate for filling the gaps 43, 44 and for maintaining a dynamic equilibrium, whilst maintaining the filling between the flowing in precipitation and the outflowing and/or evaporating precipitation. If no new water flows in, the water still present in the gaps is maintained in the latter by capillary forces and will gradually evaporate, the delay time or time lag up to which the gaps are again air-filled, being essentially determined by the geometry of the gap arrangement, particularly the gap width and the weather (atmospheric humidity, temperature). Correspondingly, by adjusting the gap geometry, e.g. by the choice of a counterbody with higher or flatter spacing webs, the reception capacity of the capillary reservoir and con sequently both the response threshold for a precipitation signal and the time lag to the dry signal following precipitation can be adjusted.

Figure 6:
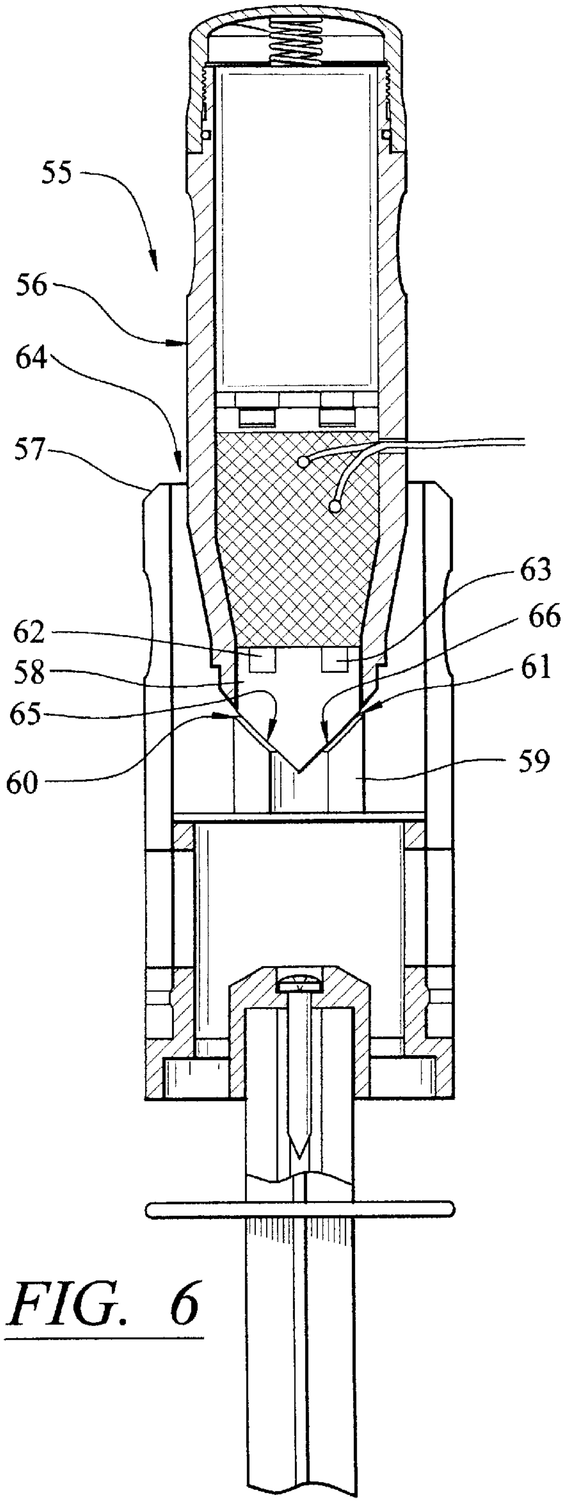
FIG. 6 A longitudinal section through another rain indicator embodiment.

FIG. 6 shows another embodiment of a rain indicator 55 equipped with a screw-down adjusting mandrel and which uses the same detection principle. This embodiment also has a measuring cartridge 56, which is inserted from above in a roughly cylindrical basic casing 57. However, unlike in the embodiment of FIG. 1, it is not fixed by a cap nut and is instead axially inserted and fixed in the basic casing 57. The insertion position and consequently the gap width of the gaps 60, 61 formed between the light guide 58 and the counterbody 59 in the axial extension of the light source 62 or light detector 63 can be adjusted by means of the insertion depth. In the represented embodiment the insertion position is defined by stop elements, which limit the insertion depth for the cartridge 56. Also in this embodiment precipitation striking the top and side surfaces of the measuring cartridge projecting over the basic casing, passes through an annular clearance-like entry gap 64 to surface portions 65, 66 of the light guide 58 adjacent to the gaps 60, 61 and provided for total light reflection.

It is obvious to the expert that for the operation of the indicator, the optical conditions described in exemplified manner must only be present on the surface portions 45 or 46 of the light guide irradiated by the light source or monitored by the detector, so that they can have numerous different shapes and even a single, suitable surface portion can be sufficient or there can be more than two of these. Total reflection can also occur with incidence angles diverging from 45°. The incidence angle must be chosen in such a way that with the surface portion dry total reflection occurs, whereas light is coupled out of the light guide on contact with precipitation.

What is claimed is:

1. Liquid indicator for indicating the presence of a liquid, the liquid indicator comprising:

at least one light source;

at least one light guide which has at least one surface portion provided for a contact with liquid, wherein the surface portion is so positioned relative to the light source that light originating from the light source can be totally reflected on the surface portion;

at least one light detector which can be brought into light conducting connection with the light source by means of the surface portion; and collecting means for collecting liquid, the collecting means being connected to said surface portion by means of a liquid supply device.

2. Liquid indicator according to claim 1, wherein the light detector is positioned relative to the surface portion whereby substantially only light originating from the light source and totally reflected on the surface portion is detectable by the light detector.

3. Liquid indicator according to claim 1, wherein a light path is defined between the light source and the light detector and wherein the light path is provided with at least two surface portions which are positioned in such away that light originating from the light source is totally reflectable to the light detector by means of the at least two surface portions.

4. Liquid indicator according to claim 3, wherein there are provided only two surface portions.

5. Liquid indicator according to claim 3, wherein the at least two surface portions are so positioned that the light originating from the light source is deflected by total reflection by more than 90°.

6. Liquid indicator according to claim 5, wherein the at least two surface portions are so positioned that the light originating from the light source is deflected by approximately 180°.

7. Liquid indicator according to claim 1, wherein the light guide comprises a circular conical segment with an opening angle of approximately 90°.

8. Liquid indicator according to claim 1, wherein there are provided at least one light source with at least one light emitting diode and at least one light detector with at least one photodiode.

9. Liquid indicator according to claim 8, wherein the light source has a single light emitting diode and the light detector has a single photodiode.

10. Liquid indicator according to claim 1, wherein there is provided a device adapted for a pulsed operation of the light source.

11. Liquid indicator according to claim 1, wherein there is provided at least one liquid reservoir adapted for receiving and storing liquid, wherein the liquid reservoir is positioned directly adjacent to said at least one surface portion.

12. Liquid indicator according to claim 11, wherein the light reservoir is constructed as a capillary reservoir, whereby the stored liquid is held in the liquid reservoir by capillary forces.

13. Liquid indicator according to claim 1, wherein there is provided at least one opposing surface positioned in relation to the surface portion in such a way that a gap is formed between the surface portion and the opposing surface whereby the gap forms a liquid reservoir.

14. Liquid indicator according to claim 13, wherein the opposing surface is constructed as an absorption surface adapted to absorb light originating from the light source.

15. Liquid indicator according to claim 1, wherein there are provided means for adjusting the response of the liquid indicator with respect to an intensity of liquid entering the collecting means.

16. Liquid indicator according to claim 11, wherein the liquid reservoir has a liquid storing capacity which is adjustable.

17. Liquid indicator according to claim 13, wherein at least one of the shape and the size of the gap is adjustable.

18. Liquid indicator for indicating the presence of a liquid, the liquid indicator comprising:

at least one light source;

at least one light guide which has at least one surface portion provided for a contact with liquid, wherein the surface portion is so positioned relative to the light source that light originating from the light source can be totally reflected on the surface portion;

at least one light detector which can be brought into light conducting connection with the light source by means of the surface portion, wherein there is provided a capillary gap for receiving liquid, said capillary gap positioned directly adjacent to said at least one surface portion.

19. Liquid indicator according to claim 1, wherein the collecting means are connected in liquid-conducting manner to a reservoir for the liquid.

20. Liquid indicator according to claim 1, wherein there is provided an outer surface of the liquid indicator, wherein the outer surface is positionable above the surface portion and wherein the outer surface is provided with a number of substantially vertically orientable grooves.

21. Liquid indicator according to claim 1, wherein there are provided liquid collecting guides converging in funnel-shaped manner towards the surface portion, wherein the collecting guides can be positioned above the surface portion.

22. Liquid indicator according to claim 21, wherein the precipitation collecting guides are in the form of coiled portion guidance webs inclined to the vertical direction and located on the outer surface of the liquid indicator.

23. Liquid indicator according to claim 21, wherein the liquid collecting guides are positioned below the collecting means.

24. Liquid indicator according to claim 1, wherein there are provided retention means for retaining liquid in at least one of the surface portion and a liquid reservoir positioned adjacent to the surface portion.

25. Liquid indicator according to claim 24, wherein the retention means, have at least one wettable element placed in a liquid reservoir adjacent to the surface portion.

26. Liquid indicator according to claim 1, further comprising an indicator upper part and a basic casing with an opening on its upper end, wherein the opening has a larger diameter than the indicator upper part and wherein the indicator upper part can be so inserted into the opening that between an outside of the indicator upper part and a wall of the basic casing there is formed at least one liquid entry gap in form of an annular clearance.

27. Liquid indicator according to claim 26, wherein the indicator upper part and the basic casing are interconnectable without tools.

28. Liquid indicator according to claim 1, wherein the liquid indicator has an indicator upper part and wherein the light guide forms a lower termination of the indicator upper part and wherein at least one surface portion of the light guide is substantially arranged in an extension of an outer face of the indicator upper part whereby liquid collecting on the indicator upper part can flow on to the surface portion.

29. Liquid indicator according to claim 13, wherein the opposing surface that is located adjacent to the surface portion is associated with a basic casing of the liquid indicator, and wherein the surface portion is associated with an indicator upper part of the indicator.

30. Liquid indicator according to claim 1, further comprising a casing for receiving the light source, and electronic control means for the light source, wherein the light detector and electronic evaluating means are associated with the light detector in a water-protected manner.

31. Liquid indicator according to claim 30, wherein the casing is associated with an indicator upper part and wherein the light guide is attached to the casing in such a way that the surface portion forms part of the outer surface of the casing.

32. Liquid indicator according to claim 1, wherein there is provided a casing forming a watertight sealable reception space for a mains-independent power supply of the liquid indicator.

33. Liquid indicator according to claim 1, adapted to operate with a mains-independent power supply.

34. A rain detector which can be placed stationary with respect to a ground surface, the rain detector including a liquid indicator comprising:

at least one light source;

at least one light guide which has at least one surface portion provided for a contact with liquid, wherein the surface portion is so positioned relative to the light source that light originating from the light source can be totally reflected on the surface portion;

at least one light detector which can be brought into light conducting connection with the light source by means of the surface portion; and collecting means for collecting precipitation, the collecting means being connected to said surface portion by means of a precipitation supply device.

35. The rain detector according to claim 34, comprising means for fixing the liquid indicator to the ground.

36. The rain detector according to claim 35, wherein the means for fixing are in the form of a screw-down insertion mandrel detachably connectable to a casing of the liquid indicator.

37. The rain detector of claim 34, further comprising signaling means for signaling (a) a dry signal and (b) a precipitation signal, the signaling means capable of signaling to a control means for controlling a watering system.

38. A rain detector including a liquid indicator, the liquid indicator comprising:

at least one light source;

at least one light guide which has at least one surface portion provided for a contact with liquid, wherein the surface portion is so positioned relative to the light source that light originating from the light source can be totally reflected on the surface portion; and at least one light detector which can be brought into light conducting connection with the light source by means of the surface portion, the rain detector further including an indicator upper part and a basic casing with an opening on its upper end, wherein the opening has a larger diameter than the indicator upper part and wherein the indicator upper part can be inserted into the opening so that between an outside of the indicator upper part and a wall of the basic casing there is formed at least one precipitation entry gap in form of an annular clearance.

39. Liquid indicator for indicating the presence of a liquid, the liquid indicator comprising:

at least one light source;

at least one light guide which has at least one surface portion provided for a contact with liquid, wherein the surface portion is so positioned relative to the light source that light originating from the light source can be totally reflected on the surface portion;

at least one light detector which can be brought into light conducting connection with the light source by means of the surface portion, wherein there is provided at least one liquid reservoir adapted for receiving and storing liquid, wherein the liquid reservoir is positioned directly adjacent to said at least one surface portion.

40. Liquid indicator according to claim 39, wherein the liquid reservoir is constructed as a capillary reservoir, whereby the stored liquid is held in the liquid reservoir by capillary forces.

41. Liquid indicator according to claim 39, further comprising collecting means connected to said reservoir by means of a liquid supply device in liquid-conducting manner.

* * * * *